United States Patent
Hintz et al.

(10) Patent No.: US 9,795,203 B2
(45) Date of Patent: Oct. 24, 2017

(54) POLYPROPYLENE TUBE

(71) Applicant: ALBEA SERVICES, Gennevilliers (FR)

(72) Inventors: Martin Hintz, Bamberg (DE); Manfred Lunz, Rattelsdorf (DE); Arthur Neuberger, Breitengüßbach (DE)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 15/305,813

(22) PCT Filed: Apr. 23, 2015

(86) PCT No.: PCT/EP2015/058745
§ 371 (c)(1),
(2) Date: Oct. 21, 2016

(87) PCT Pub. No.: WO2015/162191
PCT Pub. Date: Oct. 29, 2015

(65) Prior Publication Data
US 2017/0042308 A1   Feb. 16, 2017

(30) Foreign Application Priority Data

Apr. 24, 2014   (FR) ..................... 14 53691

(51) Int. Cl.
*A45D 34/00* (2006.01)
*A45D 40/00* (2006.01)
(Continued)

(52) U.S. Cl.
CPC ............. *A45D 34/00* (2013.01); *A45D 40/00* (2013.01); *B32B 27/08* (2013.01); *B32B 27/306* (2013.01); *B32B 27/32* (2013.01); *B32B 27/327* (2013.01); *B65D 1/40* (2013.01); *B65D 35/12* (2013.01); *B65D 43/0204* (2013.01); *B65D 43/0225* (2013.01); *B32B 2270/00* (2013.01);
(Continued)

(58) Field of Classification Search
CPC ........ A45D 34/00; A45D 40/00; B32B 27/32; B32B 27/08; B32B 27/306; B32B 27/327; B32B 2270/00; B32B 2307/406; B32B 2307/412; B32B 2307/50; B32B 2439/00; B65D 35/12; B65D 1/40; B65D 43/0204; B65D 43/0225
See application file for complete search history.

(56) References Cited

U.S. PATENT DOCUMENTS

| 6,511,568 B1 | 1/2003 | Eckstein et al. |
| 2002/0039630 A1 | 4/2002 | Rousselet et al. |

FOREIGN PATENT DOCUMENTS

| EP | 1029793 A1 | 8/2000 |
| EP | 1190950 A1 | 3/2002 |
| EP | 1495861 A1 | 1/2005 |

OTHER PUBLICATIONS

May 19, 2015—English Translation of the International Search Report of PCT/EP2015/058745.

*Primary Examiner* — Michael C Miggins
(74) *Attorney, Agent, or Firm* — Banner & Witcoff, Ltd.

(57) ABSTRACT

A tube (3) for a product, in particular a cosmetic product, of liquid or pasty consistency or in the form of a gel, having a tube head (5), and a skirt (7) having a proximal end (9) connected to the tube head (5) and an opposite distal end, and forming an internal volume (V) suitable for receiving the product. The skirt (7) and the tube head (5) are polypropylene.

20 Claims, 1 Drawing Sheet

Figure 1:
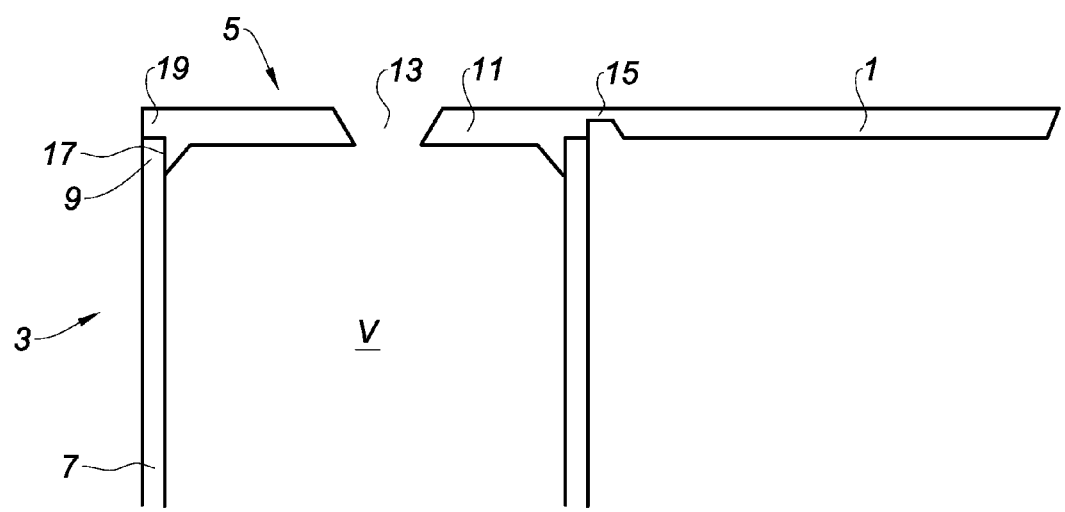

(51) Int. Cl.
*B32B 27/32* (2006.01)
*B32B 27/08* (2006.01)
*B32B 27/30* (2006.01)
*B65D 35/12* (2006.01)
*B65D 1/40* (2006.01)
*B65D 43/02* (2006.01)

(52) U.S. Cl.
CPC ... *B32B 2307/406* (2013.01); *B32B 2307/412* (2013.01); *B32B 2307/50* (2013.01); *B32B 2439/00* (2013.01)

POLYPROPYLENE TUBE

CROSS-REFERENCE TO RELATED APPLICATIONS

The present application is a U.S. National Phase filing of International Application No. PCT/EP2015/058745, filed on Apr. 23, 2015, designating the United States of America and claiming priority to French Patent Application No. 1453691 filed Apr. 24, 2014. The present application claims priority to and the benefit of all the above-identified applications, which are all incorporated by reference herein in their entireties.

The present invention relates to the field of flexible tubes for storing and dispensing products of liquid or pasty consistency. It is directed more particularly at applications in the field of tubes for cosmetic products.

Flexible tubes are commonly formed of two parts: a tube head comprising a dispensing opening for extracting a product contained in the tube, and a skirt forming the internal volume of the tube which is suitable for receiving the product.

Conventionally, the skirt is formed of a monolayer or multilayer sheet based on materials known to exhibit satisfactory mechanical strength and leak-tightness properties, while retaining a certain flexibility. This is most frequently polyethylene (PE).

Likewise, the tube head is commonly produced by injecting polyethylene so as to have effective adhesion between the head and the skirt, which comprise the same material.

Although the rigidity and the strength of polyethylene are sufficient for conventional tube heads, in particular tube heads comprising a neck and a shoulder, these properties are insufficient when a more complex tube head which includes in particular additional functions, such as a cap connected by a hinge, is desired. For this type of tube head, a more rigid, harder and stronger plastics material than that of the skirt is preferred.

Thus it is known to produce tubes in which the skirt is made of polyethylene and the tube head of polypropylene (PP). In this type of tube, it is however difficult to effectively connect the skirt and the head, which are made of different materials. It is of course possible to add additives or to modify the composition of the head and/or the skirt to promote adhesion therebetween, but these techniques are complex and result in products having a degree of head/skirt adhesion which is still too poor.

There is therefore a need for a tube having a good connection between the head and the skirt while retaining good flexibility and good mechanical strength of the skirt, and good rigidity and good solidity of the tube head.

To this end, the present invention proposes a tube for a product, in particular a cosmetic product, of liquid or pasty consistency or in the form of a gel, comprising:
 a tube head,
  a skirt having a proximal end connected to the tube head and an opposite
  distal end, and forming an internal volume suitable for receiving the product, said skirt and said tube head comprising polypropylene.

By making the tube head and the skirt from the same plastics material, i.e. polypropylene, a tube is obtained which has effective adhesion between the head and the skirt, whose risks of desolidarisation are thus limited. In other words, a polypropylene skirt also makes it possible to have a polypropylene tube head. The latter is then more resistant to handling than conventional polyethylene tube heads. It is then possible, for example, to include therein additional functions requiring greater rigidity and strength. Furthermore, it has been noted by the applicant that compositions based on polypropylene may make it possible for tube skirts to exhibit satisfactory flexibility.

According to various embodiments of the invention, which may be taken either together or separately:
 said skirt further comprises one or more polyethylene components,
 one of the polyethylene components is polyethylene obtained by metallocene catalysis, possibly accompanied by another polyethylene component in the form of polyethylene not obtained by metallocene catalysis,
 the polyethylene component obtained by metallocene catalysis is a copolymer of ethylene and an alpha-olefin, such as a C3-C20 or even a C4-C10 alpha-olefin, said copolymer preferably consisting of ethylene and octene,
 the skirt is multilayer,
 the polypropylene and the polyethylene component or components obtained by metallocene catalysis are separately present in at least two individual layers of the skirt,
 the polypropylene is present in a layer of the skirt which is in contact with the tube head,
 said layer of the skirt which is in contact with the tube head is an inner layer of the skirt,
 the tube head is attached to said skirt so as to be in contact with said inner layer,
 in other words, advantageously the polypropylene is present in said inner layer of the skirt and the head is attached to said skirt so as to be in contact with said inner layer,
 the polyethylene obtained by metallocene catalysis is present in a layer that is adjacent to the inner layer,
 the layer comprising polyethylene obtained by metallocene catalysis is a central layer,
 at least one of the layers comprises polyethylene not obtained by metallocene catalysis,
 the thickness of the layer comprising the polyethylene not obtained by metallocene catalysis represents at least ¼ of the total thickness of the skirt, or even at least ½ of the total thickness of the skirt,
 the polyethylene not obtained by metallocene catalysis is present in an outer layer,
 the polyethylene not obtained by metallocene catalysis is a mixture of low-density polyethylene and of linear low-density polyethylene,
 said tube comprises a barrier layer,
 said barrier layer is a metal layer, made of aluminium for example, and/or a layer of ethylene vinyl alcohol (EVOH),
 the polypropylene and the polyethylene obtained by metallocene catalysis are present in at least one common layer of the skirt, in the form of a mixture,
 said mixture comprises at least 20%, or even at least 30%, or even at least 50% by weight of polyethylene obtained by metallocene catalysis,
 said mixture comprises at most 80%, or even at most 70%, or even at most 50% by weight of polypropylene,
 said skirt is monolayer,
 said tube head is 100% polypropylene and said skirt is made of polypropylene and of polyethylene obtained by metallocene catalysis,
 said tube head comprises a shoulder and a neck connected to the shoulder.

The invention also relates to an assembly formed of a cap and a tube as described previously.

According to different features of the invention, which may be taken either together or separately:
- said cap is made of the same material as the tube head,
- said cap is fixed to said tube head,
- said cap is fixed to said neck of said tube head,
- said cap is fixed by snap-fitting and/or screwing.

Figure 2:

Other features, objects and advantages of the invention will become apparent from the following description, which is purely illustrative and not limitative, and which should be read with reference to the accompanying drawings, in which:

FIG. 1 shows schematically a partial sectional view of an assembly of a cap and a tube according to one aspect of the invention, FIG. 2 shows schematically a partial sectional view of a multilayer skirt according to one aspect of the invention.

In all the figures, common elements are marked by identical reference numerals.

FIG. 1 partially shows an assembly of a cap 1 and a tube 3 for a product, in particular a cosmetic product, of liquid or pasty consistency or in the form of a gel, according to one aspect of the invention. The tube 3 comprises:
- a tube head 5,
- a skirt 7 having a proximal end 9 connected to the tube head 5 and an opposite distal end (not shown), and forming an internal volume V suitable for receiving the product.

In this embodiment, said tube head 5 comprises a flat transverse wall 11 that extends in a plane orthogonal to the axis of the skirt 7 and is provided with an opening 13 for dispensing the product contained in the internal volume V of the tube 3. Said tube head 5 is connected to the cap 1 by means of a hinge 15.

Said tube head 5 may further comprise an insert (not shown here) arranged in contact with the transverse wall 11, typically in contact with a face of the transverse wall 11 which is oriented towards the internal volume V of the tube 3, which volume is defined by the skirt 7.

Typically, said insert is made of a multilayered material comprising a barrier layer limiting the infiltration and the leakage of the undesirable components through the tube head. The inserts commonly used are composed of two layers of plastics material surrounding the intermediate barrier layer. The two layers of plastics material serve to isolate the metal layer from the product contained in the tube, which is liable to damage it. The barrier layer typically comprises a metal layer and/or a layer of ethylene vinyl alcohol (EVOH).

The head comprises an attachment surface 17 to which the proximal end 9 of the skirt 7 is connected, and an upper annular portion 19 located on the periphery of the head 5 covering the edge of the proximal end 9 of the skirt 7.

The skirt 7 may be connected to the tube head 5 either by overmoulding the tube head 5 on the skirt 7 or by welding or bonding by fitting the skirt 7 to the tube head 5 formed previously, in particular by injection or by injection compression, or by any other techniques.

According to the invention, said skirt 7 and said tube head 5 comprise polypropylene (PP).

Preferably, the polypropylene is either a polypropylene homopolymer (PPH) or a polypropylene copolymer, in particular a random copolymer (PPR), or a mixture thereof. The type of polypropylene of the tube head 5 may be identical to or different from that of the skirt 7.

The polypropylene is advantageously a polymer having mechanical properties, in particular rigidity, hardness and strength, which are greater than those of polyethylene. Thus, the polypropylene tube head 5 makes it possible to resist handling better than conventional polyethylene tube heads. The fact that the head 5 and the skirt 7 both comprise polypropylene makes it possible to obtain effective adhesion therebetween and limits the risks of detachment.

Advantageously, the polypropylene is present in a layer of the skirt 7 which is in contact with the tube head 5.

Advantageously, said skirt 7 further comprises one or more polyethylene components. The polyethylene has the advantage of providing flexibility to the skirt 7 of the tube 3.

One of these polyethylene components is preferably polyethylene obtained by metallocene catalysis (PEm).

A polyethylene obtained by metallocene catalysis is a polyethylene obtained by a polymerisation reaction based on an organometallic catalytic system such as a metallocene. Metallocenes and such polymerisation reactions are known to the person skilled in the art.

Advantageously, the polyethylene obtained by metallocene catalysis is a copolymer of ethylene and an alpha-olefin, such as a C3-C20 alpha-olefin. Preferably, said copolymer consists of ethylene and octene.

Preferably, the density of the polyethylene obtained by metallocene catalysis, measured in accordance with ASTM Standard D792, is of between 0.890 and 0.920 g/cm$^3$, preferably of between 0.900 and 0.915 g/cm$^3$. Preferably, the melt flow index, measured in accordance with ASTM Standard D1238 at 190° C. using a charge of 2.16 kg, is of between 0.1 and 10 g/10 min, preferably between 0.1 and 5 g/10 min. This may for example be a copolymer from a range of copolymers sold by Dow under the name Affinity.

This polyethylene obtained by metallocene catalysis may optionally be added of polyethylene not obtained by metallocene catalysis. Advantageously, the polyethylene not obtained by metallocene catalysis is a mixture of low-density polyethylene (LDPE) and of linear low-density polyethylene (LLDPE). Preferably, the mixture comprises between 20 and 80%, or even between 20 and 50% of LDPE and between 80 and 20%, or even between 80 and 50% of LLDPE: the mixture preferably comprises 30% of LDPE and 70% of LLDPE.

In a first embodiment of the skirt 7, shown in FIG. 2, said skirt 7 is a multilayer skirt in which the polypropylene and the polyethylene component obtained by metallocene catalysis are separately present in at least two individual layers of the skirt 7.

This embodiment in particular relates to a multilayer skirt comprising three superposed main layers: an inner layer 21 oriented towards the inside of the internal volume V of the tube 3, an outer layer 23 oriented towards the outside of the tube 3 and a central layer 25 located between the inner layer 21 and the outer layer 23.

Said inner layer 21 corresponds to the layer of the skirt 7 which is in contact with the tube head 5 and the polypropylene is present in said inner layer 21 of the skirt 7. Said head 5 is thus attached to said skirt 7 so as to be in contact with said inner layer 21. Such a configuration allows for contact between two polypropylene-based materials and effective adhesion between said materials.

If the embodiment comprises polyethylene not obtained by metallocene catalysis, said polyethylene is preferably present in an outer layer 23. This layer allows to provide flexibility to the skirt 7 of the tube 3, and an appearance (gloss and transparency, for example) and feel which are pleasant for the user and are similar to those of a skirt made entirely of polyethylene. The outer layer 23 may also comprise polypropylene.

The polyethylene obtained by metallocene catalysis is, for its part, present in a layer adjacent to the inner layer 21. Here, this layer is said central layer 25. It allows to provide not only flexibility to the skirt 7 but also effective adhesion between the polypropylene layer and another polyethylene layer, in particular the outer layer 23.

In a second embodiment (not shown), the skirt 7 may be a bilayer formed of an inner layer 21 and an outer layer 23. Said inner layer 21 corresponds to the layer of the skirt 7 in contact with the tube head 5 and the polypropylene is present in said inner layer 21 of the skirt 7. As described previously, such a configuration makes it possible to have a skirt 7 and a head 5 which are in contact by means of two polypropylene-based materials, permitting effective adhesion therebetween. In the case of a skirt 7 comprising polyethylene obtained by metallocene catalysis, said polyethylene is preferably present in the outer layer 23 that is adjacent to the inner layer 21. This polyethylene-based layer gives the skirt 7 flexibility and a pleasant appearance and feel. It is also possible for the outer layer 23 to comprise polypropylene.

Thus, in this embodiment, the tube head 5 may be of 100% polypropylene (for example a random polypropylene copolymer) and the skirt 7 may be made of polyethylene obtained by metallocene catalysis and of polypropylene, for example a random polypropylene copolymer. The skirt 7 is a multilayer skirt, obtained for example by coextrusion, in which the inner layer is made of polypropylene and the outer layer is made of polyethylene obtained by metallocene catalysis. Such a skirt has a gloss and a flexibility similar to a skirt made entirely of polyethylene. The skirt 7 and the tube head 5 formed previously can be fitted by welding, for example by hot-air welding.

In a third embodiment, not shown, the skirt 7 may be a multilayer skirt comprising a barrier layer. It may for example be a layer of ethylene vinyl alcohol (EVOH) and/or a metal layer such as an aluminium layer. The barrier layer is preferably a central layer located between an inner layer and an outer layer. As described previously in the first embodiment, said inner layer 21 corresponds to the layer of the skirt 7 in contact with the tube head 5, and the polypropylene is preferably present in the inner layer in order to be in contact with the polypropylene tube head 5 and to provide effective adhesion between the skirt 7 and the head 5. The outer layer may comprise polypropylene and/or polyethylene in order to provide flexibility to the skirt 7.

The multilayer may comprise adhesion layers between the main layers, in particular in the case of a multilayer comprising a barrier layer. This may be for example modified polypropylene and/or polyethylene.

More generally, the thickness of the layer comprising the polyethylene not obtained by metallocene catalysis represents at least ¼ of the total thickness of the skirt 7, or even at least ½ of the total thickness of the skirt 7.

The multilayer skirt 7 may be obtained by coextrusion or lamination.

In a fourth embodiment, not shown, the skirt 7 may be a monolayer. This layer corresponds to the layer of the skirt 7 in contact with the tube head 5. It may comprise only polypropylene or a mixture of polypropylene and one or more polyethylene components. The polyethylene may be a polyethylene obtained by metallocene catalysis. Said mixture comprises at least 20%, or even at least 30%, or even at least 50%, by weight of polyethylene obtained by metallocene catalysis, and/or at most 80%, or even at most 70%, or even at most 50%, by weight of polypropylene.

Examples of Tubes 3 According to the Invention:

In the examples given below, the thicknesses are given solely by way of example, and may vary.

EXAMPLE 1

|  |  | Material | Thickness |
|---|---|---|---|
| Skirt: | Inner layer | PPR | 100-150 μm |
|  | Outer layer | PEm | 200-250 μm |
| Head: | Monolayer | PPR |  |

EXAMPLE 2

|  |  | Material | Thickness |
|---|---|---|---|
| Skirt: | Inner layer | PPR | 100-150 μm |
|  | Central layer | PEm | 50-100 μm |
|  | Outer layer | LDPE/LLDPE | 100-150 μm |
| Head: | Monolayer | PPR or PPH |  |

EXAMPLE 3

|  |  | Material | Thickness |
|---|---|---|---|
| Skirt: | Inner layer | PPR | 100-200 μm |
|  | Central layer | PEm | 100-200 μm |
|  | Outer layer | PPR | 100-200 μm |
| Head: | Monolayer | PPR |  |

EXAMPLE 4

|  |  | Material | Thickness |
|---|---|---|---|
| Skirt: | Inner layer | PPR | 150-200 μm |
|  | Adhesion layer | Modified PP | 10-20 μm |
|  | Central layer | EVOH | 10-50 μm |
|  | Adhesion layer | Modified PP | 10-20 μm |
|  | Outer layer | PPR | 150-200 μm |
| Head: | Monolayer | PPR |  |

EXAMPLE 5

|  |  | Material | Thickness |
|---|---|---|---|
| Skirt: | Monolayer | PPR | 200-400 μm |
| Head: | Monolayer | PPR or PPH |  |

EXAMPLE 6

|  |  | Material | Thickness |
|---|---|---|---|
| Skirt: | Monolayer | PPR/PEm 80:20 | 200-400 μm |
| Head: | Monolayer | PPR | |

EXAMPLE 7

|  |  | Material | Thickness |
|---|---|---|---|
| Skirt: | Monolayer | PPR/PEm 70:30 | 200-400 μm |
| Head: | Monolayer | PPR | |

EXAMPLE 8

|  |  | Material | Thickness |
|---|---|---|---|
| Skirt: | Monolayer | PPR/PEm 50:50 | 200-400 μm |
| Head: | Monolayer | PPR | |

It should be noted that variants are of course possible and that the present invention is not limited to an assembly of a cap and a tube as described previously, i.e. a cap made of the same material as a tube head comprising a flat transverse wall. In particular, it is possible to extend the present invention to other types of tube heads, in particular conventional tube heads comprising a shoulder and a neck connected to the shoulder. Furthermore, said cap may be removable from the tube head in the form of a service-cap. It may then be fixed to said tube head, in particular to said neck, by snap-fitting and/or screwing.

The invention claimed is:

1. Tube for a product, in particular a cosmetic product, of liquid or pasty consistency or in the form of a gel, comprising:
   a tube head,
   a skirt having a proximal end connected to the tube head and an opposite distal end, and forming an internal volume (V) suitable for receiving the product,
   wherein:
   said skirt is multilayer,
   an inner layer of said skirt and said tube head comprise polypropylene; and
   said tube head is attached to said skirt so as to be in contact with said inner layer.

2. Tube according to claim 1, wherein at least one of the layers comprises polyethylene not obtained by metallocene catalysis, and the thickness of one of the layers comprising polyethylene not obtained by metallocene catalysis represents at least ¼ of the total thickness of the skirt.

3. Tube according to claim 1, wherein polypropylene and polyethylene obtained by metallocene catalysis are separately present in at least two individual layers of the skirt.

4. Tube according to claim 3, wherein polyethylene obtained by metallocene catalysis is present in a layer adjacent to the inner layer.

5. Tube according to claim 3, wherein the layer comprising polyethylene obtained by metallocene catalysis is a central layer.

6. Tube according to claim 1, wherein polyethylene not obtained by metallocene catalysis is present in an outer layer.

7. Tube according to claim 6, wherein said skirt further comprises one or more polyethylene components.

8. Tube according to claim 7, wherein one of the polyethylene components is made of polyethylene obtained by metallocene catalysis, optionally accompanied by another polyethylene component in the form of polyethylene not obtained by metallocene catalysis.

9. Tube according to claim 1, wherein the skirt comprises a layer formed of a mixture of polypropylene and of polyethylene obtained by metallocene catalysis.

10. Tube according to claim 9, wherein the mixture comprises at least 20 wt. % of polyethylene obtained by metallocene catalysis.

11. Tube according to claim 9, wherein the mixture comprises at most 80 wt. % of polypropylene.

12. Assembly of a cap and a tube according to claim 1.

13. Assembly according to claim 12, wherein the cap is in continuity of material of the tube head.

14. Tube for a product, in particular a cosmetic product, of liquid or pasty consistency or in the form of a gel, comprising:
   a tube head,
   a skirt having a proximal end connected to the tube head and an opposite distal end, and forming an internal volume suitable for receiving the product,
   wherein:
   said skirt being monolayer; and
   said skirt and said tube head comprising polypropylene.

15. Assembly of a cap and a tube according to claim 14.

16. Tube according to claim 14, wherein the skirt comprises a mixture of polypropylene and of polyethylene obtained by metallocene catalysis.

17. Tube according to claim 16, wherein the mixture comprises at least 20 wt. % of polyethylene obtained by metallocene catalysis.

18. Tube according to claim 16, wherein the mixture comprises at most 80 wt. % of polypropylene.

19. Tube according to claim 14, wherein said skirt further comprises one or more polyethylene components.

20. Tube according to claim 19, wherein one of the polyethylene components is made of polyethylene obtained by metallocene catalysis, optionally accompanied by another polyethylene component in the form of polyethylene not obtained by metallocene catalysis.

* * * * *